United States Patent
Peyre

(10) Patent No.: US 6,945,368 B2
(45) Date of Patent: Sep. 20, 2005

(54) MECHANICAL BRAKES WITH PADS FOR BICYCLES

(75) Inventor: Henri Peyre, Saint Benin d'Azy (FR)

(73) Assignee: Look Cycle International, Nevers (FR)

( * ) Notice: Subject to any disclaimer, the term of this patent is extended or adjusted under 35 U.S.C. 154(b) by 0 days.

(21) Appl. No.: 10/442,193

(22) Filed: May 21, 2003

(65) Prior Publication Data

US 2004/0074705 A1 Apr. 22, 2004

(30) Foreign Application Priority Data

May 21, 2002 (FR) .............................................. 02 06182

(51) Int. Cl.[7] ............................ B62L 3/00; F16H 53/00; F16C 1/16
(52) U.S. Cl. ............................... 188/24.22; 188/21.14; 188/2 D; 74/567
(58) Field of Search .......................... 188/24.11–24.13, 188/24.19, 24.21, 24.22, 2 D, 64; 74/567, 516, 518

(56) References Cited

U.S. PATENT DOCUMENTS 508,269 A * 11/1893 Bartel ...................... 188/24.11
597,031 A * 1/1898 Stanley ..................... 188/24.21
4,391,352 A * 7/1983 Brown ...................... 188/24.12

FOREIGN PATENT DOCUMENTS

| FR | 536488 A | 5/1922 |
| GB | 411036 A | 5/1934 |
| GB | 566034 A | 12/1944 |

* cited by examiner

Primary Examiner—Xuan Lan Nguyen
(74) Attorney, Agent, or Firm—Young & Thompson

(57) ABSTRACT

The present invention relates to brakes mounted in particular on all terrain bicycles. It relates, as to the first embodiment, to a brake comprising identical arms (17) mounted freely in rotation on trunnions, carrying for each of the arms (17) at its upper portion a hollow V shaped cam (23) pierced at its middle, the angle of the dihedral of about 90°, the bisecting edge horizontal, which receives a pin (9) carrying a cam finger (21) which acts against the cam (23) to close the brake. The pin (9) is secured to the end (3) of the movable arch (1) which controls the action of the brake with a movement of rotation from holes (4, 5) located in the upper central portion of the arch (1). Compression springs (26) disposed about pins (9) ensure the holding and return of the arms (17) into position.

18 Claims, 8 Drawing Sheets

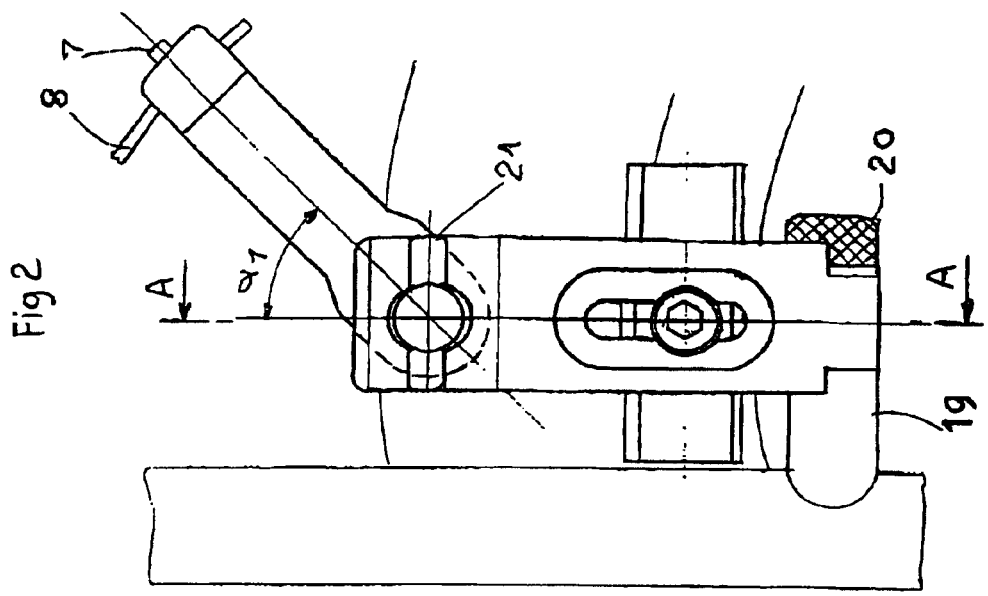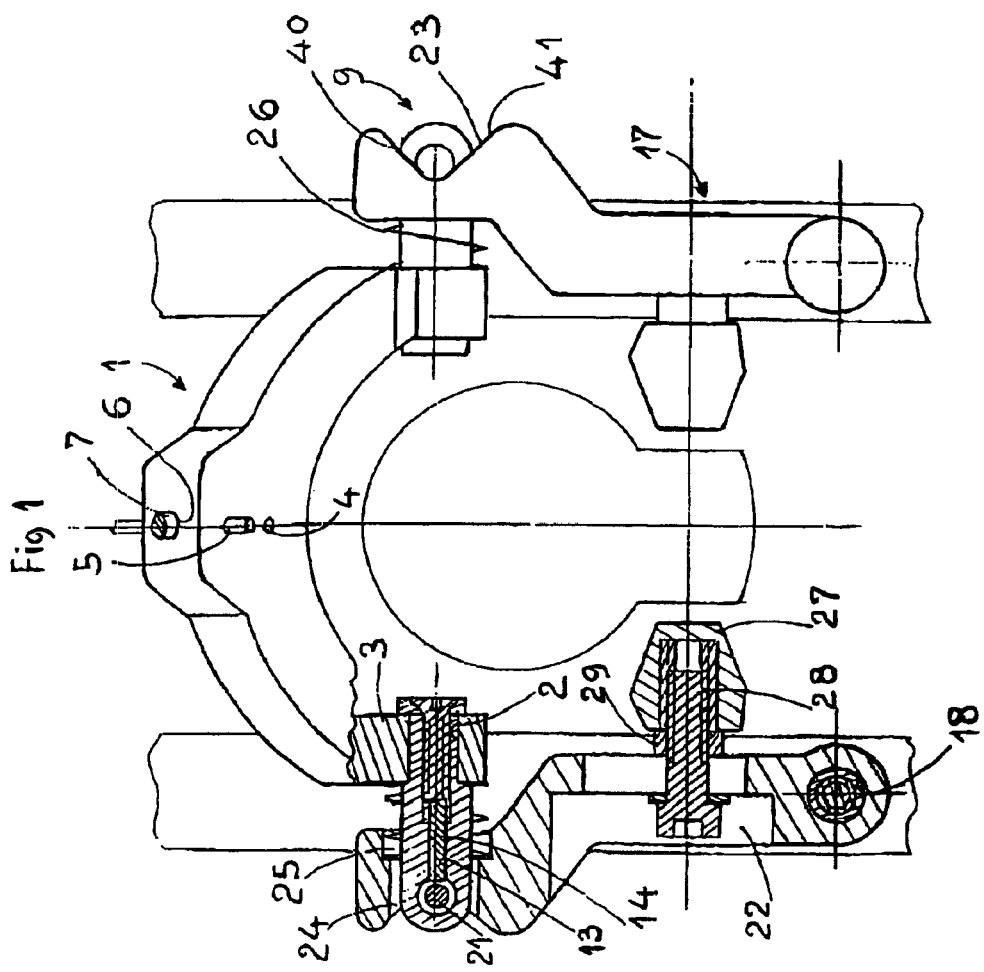

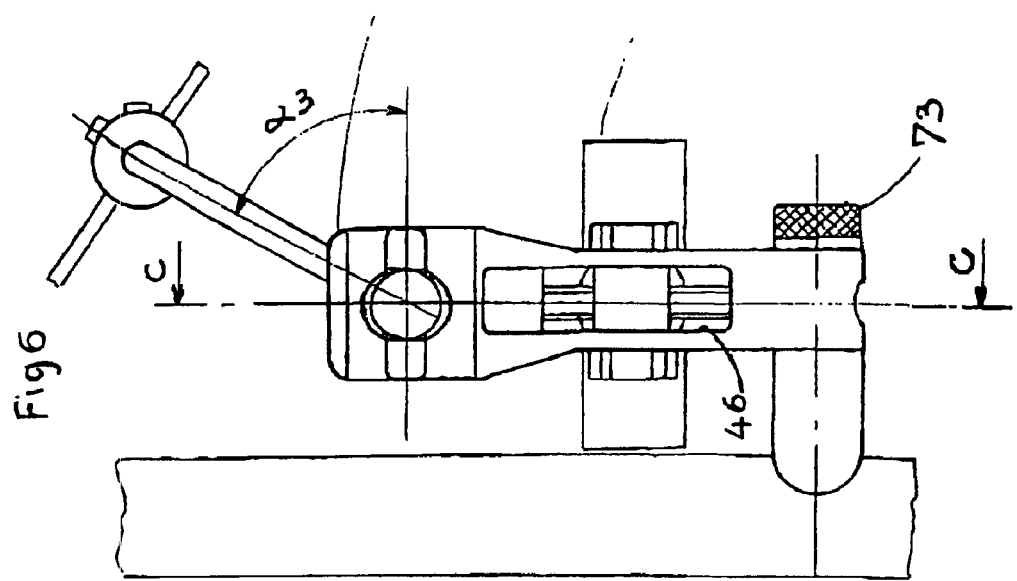
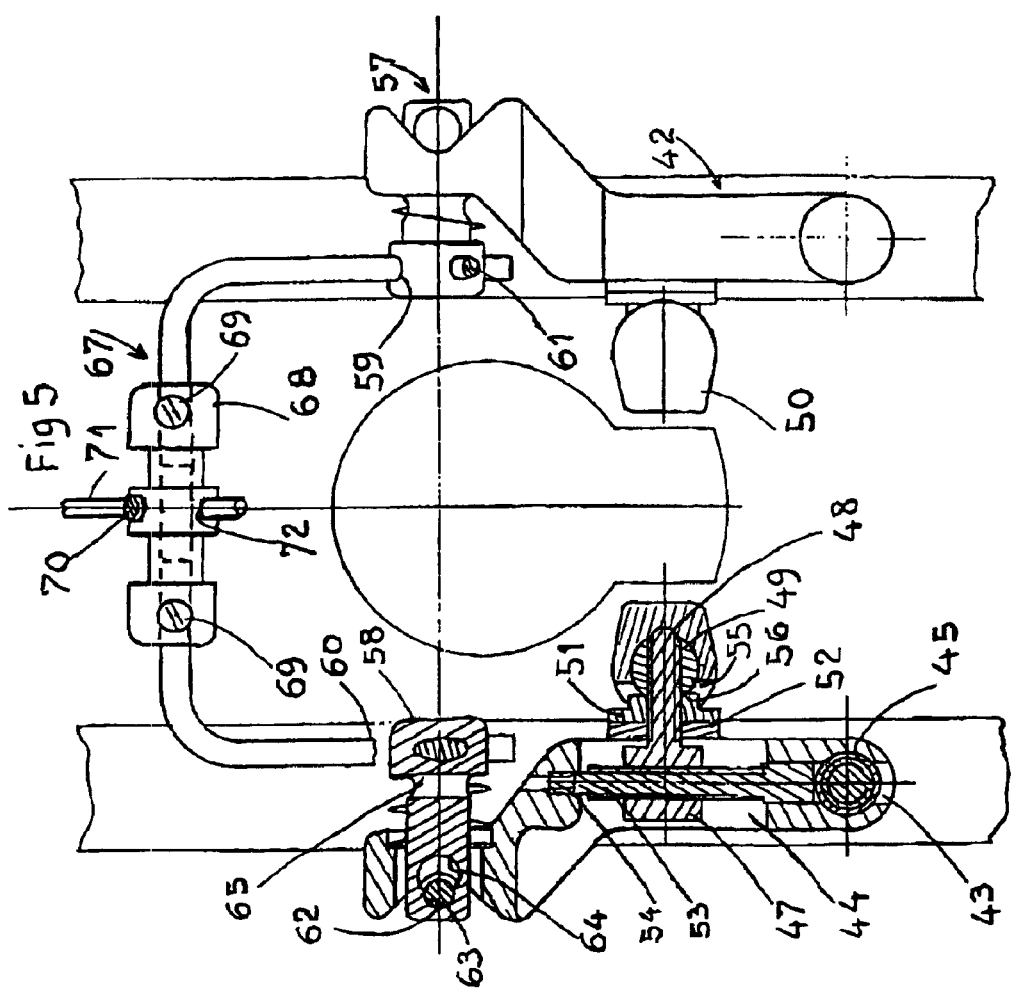

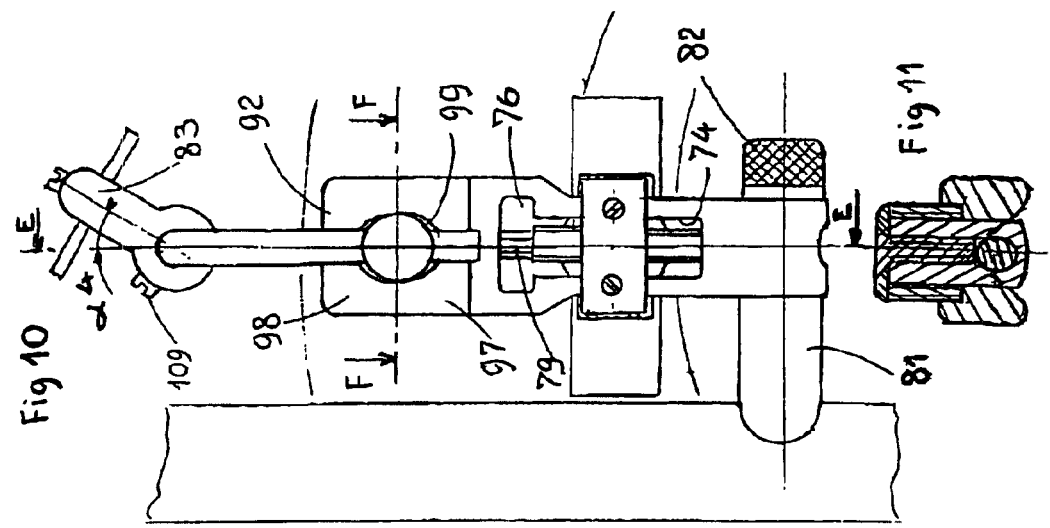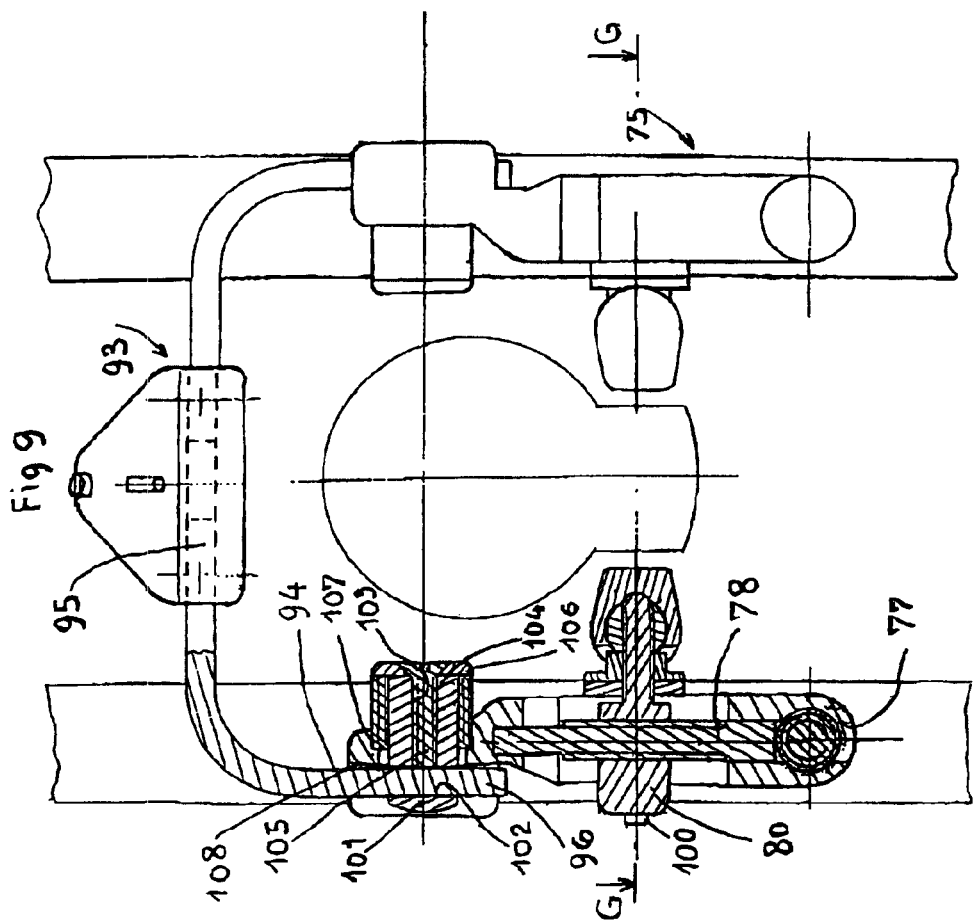

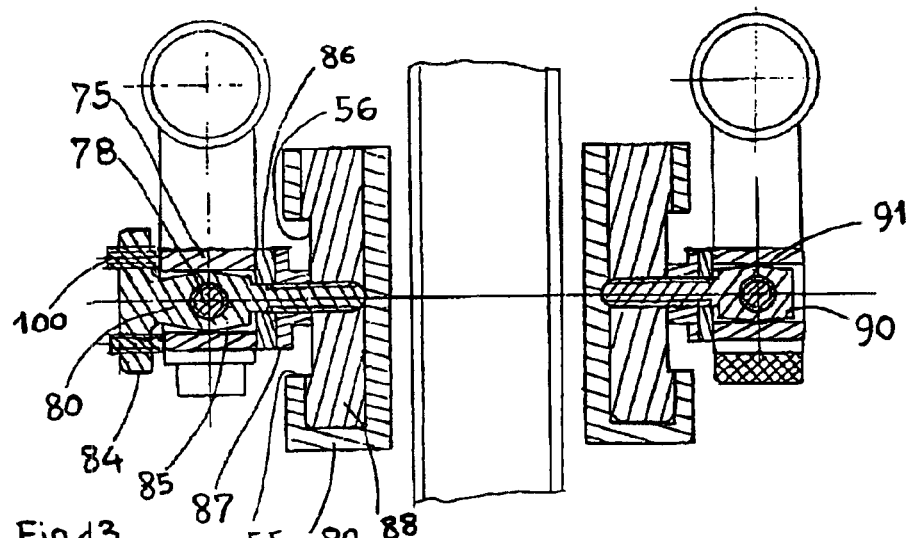
Fig 12
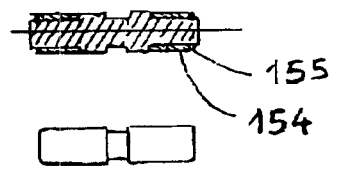
Fig 13
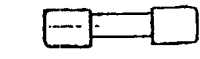
Fig 14
Fig 14 A
Fig 15
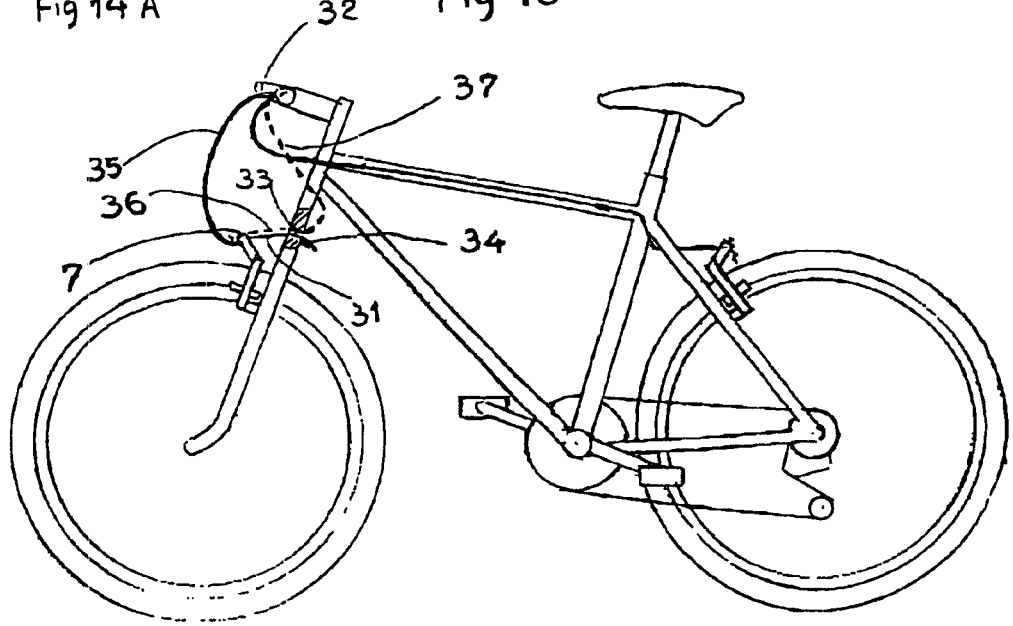
Fig 16

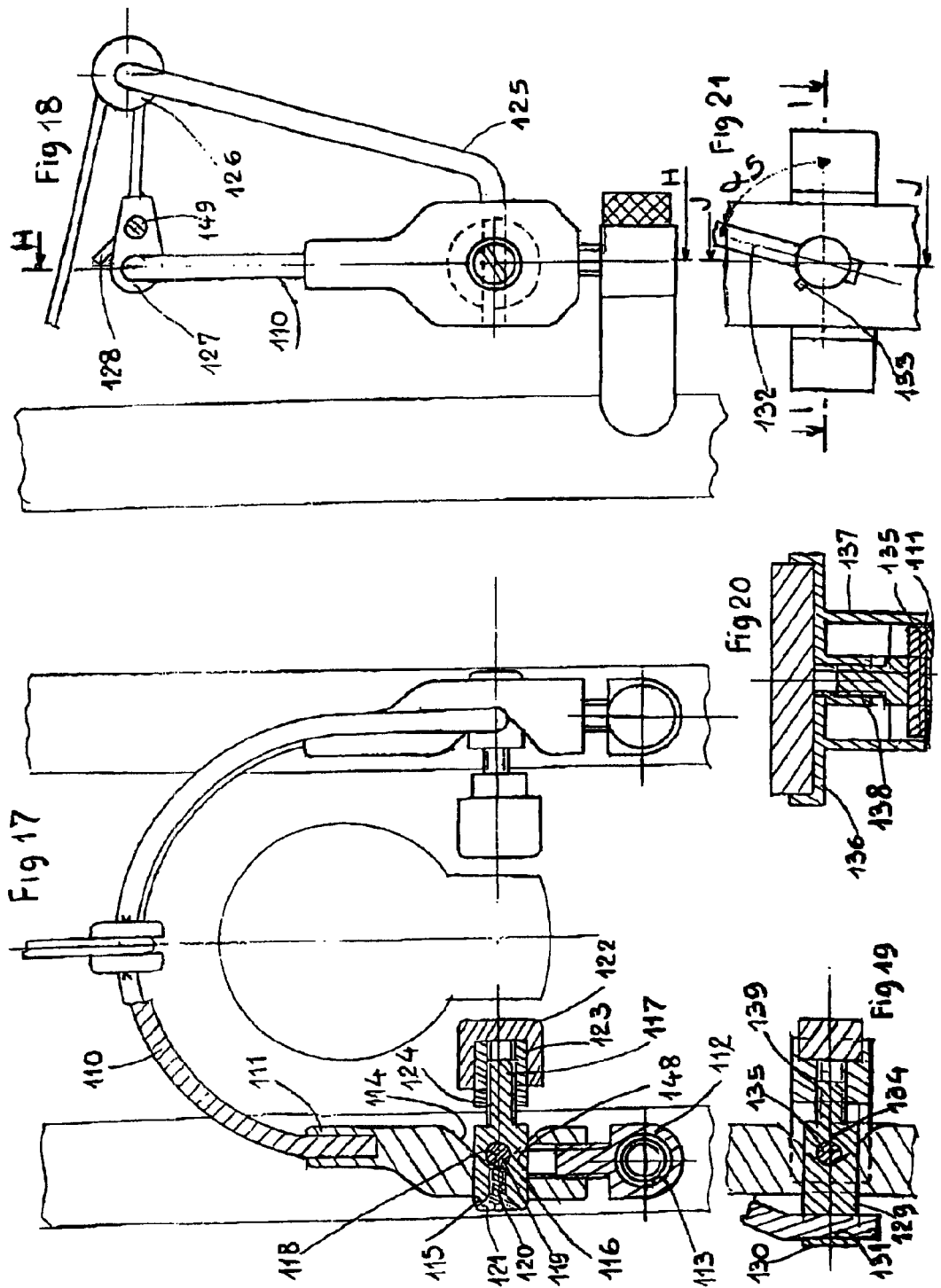

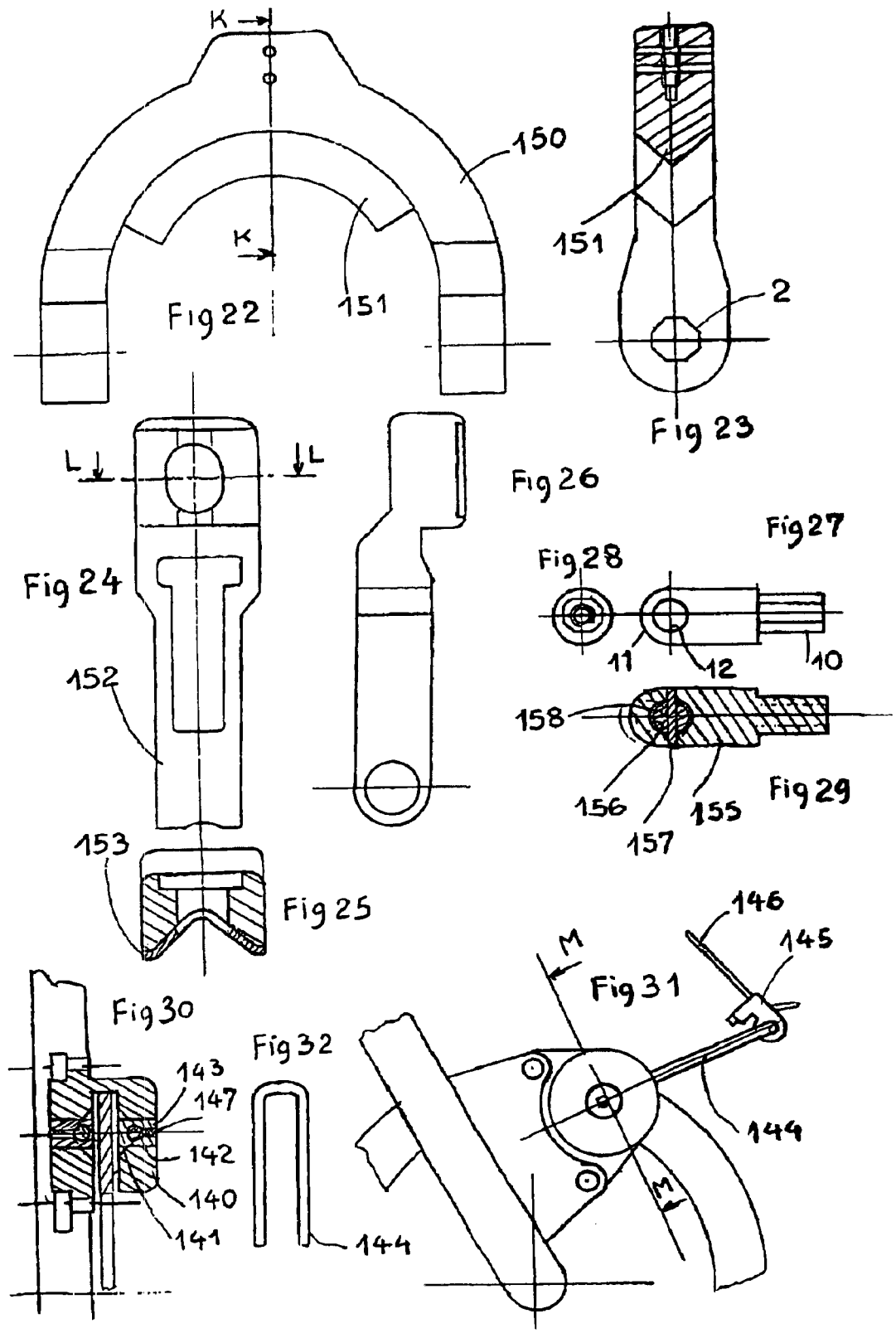

MECHANICAL BRAKES WITH PADS FOR BICYCLES

BACKGROUND OF THE INVENTION

The present invention is in the field of brakes with pads on wheel rims adapted to be mounted on bicycles, particularly all terrain bicycles.

DESCRIPTION OF THE RELATED ART

The brakes with pads on wheel rims currently used are actuated either by hydraulic systems or by mechanical systems. Hydraulic brakes are often very efficacious in braking action, but have drawbacks inherent in any hydraulic system: complexity of components, vulnerability of the circuits, the need to monitor the oil reserve, and high price. They also lack progressivity in braking. Mechanical brakes with tensioning of cables and sleeves perpendicular to the brake arms or transversely to these, comprise two independent symmetric brake arms, pivotally mounted on trunnions secured to the bicycle, these arms are held in return to initial position by torsion or bending springs of which one end is disposed in the trunnion. These springs are fragile and difficult to remount after disassembly of the brake. The adjustment of the brake pads relative to the wheel rim is sensitive. Often in the braking action, one pad touches the wheel rim before the other, which gives rise to vibrations because during braking, the two pads are not pressed against the wheel rim with the same force. Certain high range brakes have systems of parallel application of the pads to the wheel rims comprising fragile and bulky connecting rods. These brakes are sensitive to mud, the cables and the sleeves which connect the brake arms pass very closely to the tire. The brake cables are not always mounted in a same direction, which gives rise to friction and poor return of the pads to the rest position. It is necessary to disassemble and manipulate these brakes with precaution, the springs and the adjustment rings being secured only by mounting on the trunnion. The pieces of these brakes are different for each arm. If braking is effective, these brakes lack progressivity and by an effect of abutment of the pads against the wheel rims, prolong braking tires the hands.

SUMMARY OF THE INVENTION

The invention which will be described proposes providing solutions to the mentioned drawbacks. It relates in the first embodiment to a mechanical braking system with pads, comprising two identical and reversible braking arms, mounted freely in rotation on trunnions, each arm carrying at the upper portion a hollow V shaped cam pierced in its middle, the dihedral angle being about 90°, the bisecting edge is horizontal, the cam is outwardly open, the closing of the brake being controlled by an arch movable with a movement of rotation whose axis is parallel to the axis of rotation of the wheel from holes located in the upper and central section of the arch by the action of the braking cable or the sleeve connected to the braking handle, the movable arch being connected on the internal side of the arm, in a disassembleable manner, by its ends to pins whose longitudinal axes are horizontal when the brake is at rest, carrying cam fingers acting in movements of rotation transmitted by the pins against the sides of the cams, the arms are held and returned to rest position by metallic compression springs disposed about the pins which act to space transversely from the brake the arms of the movable arch, whilst pressing the cam fingers against the cams. The movable arch can deform in the direction of its width in case of too great pressure of the pads against the wheel rim; the brake comprising a floating assembly aligned relative to the axis of the wheel by the brake cable. The longitudinal axis of the movable arch forms a favored angle of about 45° with the longitudinal axes of the brake arms. This angle can be adjusted with the particularity of a frame when the pins of the movable arch are provided with endless assembly teeth. By the play of the lever arms given by the positions of the cam and of the pad on the brake arm relative to its axis of rotation on the trunnion and by the play of the lever arms of the movable arch and of the cam finger, the force to be provided by the brake handle is low, the more so the greater is the path of the arch in the braking action, which gives high progressivity to the latter. The movable arch is of a plastic material, its cross section is calculated so as to deform by opening if the pressure of the pads against the wheel rim is too great, which avoids blocking of the wheels. The brake is held in the middle of the arch by the cable and it is stabilized by two springs of identical lengths and strengths, which gives a positioning of the arms at the same spacing from the wheel rim. The brake being floatably mounted and without constraint, during braking action the pads scrape in identical manners against the wheel rim, which improves the grip of the wheel relative to the ground. The disassembled brake forms a compact assembly without any piece to destabilize it. The screws which hold the brake on the trunnions are screws with a mechanical lock or screws with a quarter turn to be able to change rapidly a wheel without being troubled by the brake pads. The paths of the brake cables and the sleeves are always along the medial plane of the bicycle.

In a second embodiment, the general principle of operation is the same. The movable control arch is in three parts: two elbowed branches of metallic prod and an assembly sleeve for the branches, of light metal or plastic material. This sleeve permits adjustment by spacing the brake arms relative to the wheel rim and the passage, orientation and immobilization of the brake control cable. The movable arch is adjustable in height by screws secured to the pins. The brake pads are mounted on a cylindrical pad carrier permitting their automatic orientation parallel to the wheel rim and they are adjustable in height relative to the wheel rim by screws secured to the brake arms, these three particularities: adjustment of the spacing by the sleeve, adjustment in height by the screws, and automatic orientation of the pads, permit omitting rings and adjustment pans which are mounted on the conventional pad carriers and to save time during adjustment of the brakes. The pins carry keyholes for the mounting of the cam fingers, which avoids screws, permits orientation of the cam finger relative to the flanks of the cam during the braking phase, and can be a means, upon removing it, for rapid spacing of the brake pads for the passage of a wheel.

In the third embodiment of the invention, the general principle of operation of the brake is the same as in the second embodiment. The edge of the dihedral of the cam carried by the arm is vertical. The cam finger is the prolongation of the movable arch in three parts which is present vertically when the brake is at rest. The assembly sleeve has a flat portion offset relative to the longitudinal axis of the sleeve, which permits the brake cable to be connected to this offset portion, for continuous adjustment of the angle of attack of the movable arch relative to the vertical axis of the arms. The return springs for the arms are of elastomeric material. Two solutions for the orientation of the longitudinal axes of the pads relative to the plane of the wheel rim are proposed: one permanent by screwing, and one automatic by a chamfered pad carrying nut and a spring ring.

In the fourth embodiment of the invention, the general principle of operation with a movable arch and cam control, is the same, the arms and the pads being different. The identical and reversible brake arms are connected at their summit by a fixed arch which can deform in the direction of its width, which can be a metallic rod or a plastic material. The adjustment in height of the arms is ensured by screw threaded braces mounted on the trunnions. The cams opening at about 90° are located within arms at the level of the brake pads. The pins controlled by the movable arch carry the pads. These pads can be present in two forms, either cylindrical, the connections between the cam fingers which are the ends of the movable arch and the pins taking place at the level of the edges of the dihedral of the cams, or normal with guided rectilinear movement, the cam fingers are independent pieces and the connections between the pins and the movable arch take place outside the arms. The movable arch has a roller for passage of the brake cable, which is topped by a movable connection piece at the summit and at its middle of the fixed arch. The movable arch is prestressed by spacing, it is this that ensures by its resilience the holding in place and the return of the pads, during braking action it narrows in width.

This embodiment can be adapted to a disc brake.

It is possible to produce a brake by combining the different elements of the embodiments.

These elements can correspond to one or several of the following characteristics applied to mechanical brakes with pads adapted particularly to be mounted on bicycles, preferably on all terrain bicycles, acting to brake by friction of the pads:

- an arch movable in rotation whose axis of movement is parallel to the axis of rotation of the wheel, the arch being adapted to deform resiliently in the direction of its width, the arch being activated at its upper and central portion by the action of a cable or a sleeve connected to the brake handle, the arc being connected at each of its ends disassembleably to a pin receiving a cam finger which acts with a movement of rotation transmitted by the pin against the flanks of a hollow cam pierced with a hole arranged to receive the pin, the hollow V shaped cam whose dihedral angle is about 90°, controls with its movement of rotation the action of the pads, the resilient return system of the pads being located at the level of the pins.
- each brake comprises two identical and reversible arms mounted freely turnably on the trunnions, each of the arms carrying at its upper portion a hollow V shaped cam pierced perpendicularly relative to the longitudinal axis of the arm by an oblong hole and a cylindrical flat, which cam is turned outwardly of the arm and whose edge bisecting the dihedral is horizontal and the plane angle being about 90°, the pin which passes through the cam through the oblong hole and the cylindrical flat carry a cam finger connected to the movable arch on the inner side of the arm, the arms are held in return to the rest position after braking action by metallic compression springs disposed about the pins, the arms are mounted freely turnably on the trunnions such that the brake in place constitutes a floating assembly, without constraint, whose axis of symmetry in the facing plane is maintained in the plane of the axis of symmetry in the width of the wheel by the brake cable passing through a hole located in the upper and central sector of the movable arch when the brake is at rest.
- each brake comprises two identical and reversible arms mounted freely turnably on the trunnions, each of the arms carrying at its upper portion a hollow cam pierced perpendicularly relative to the longitudinal axis of the arm by an oblong hole and by a cylindrical flap, which cam is turned outwardly of the arm and whose bisecting edge of the dihedral is vertical and the plane angle of about 90°, the pin which passes through the cam carries on its outer side of the arm a cam finger which is one end of the elbowed branch of the movable arch, the arms are held and returned to rest position after braking action by elastomeric springs disposed about the pins, disposed in part in the cylindrical flats, these springs also ensuring the positioning of the pins in the middle of the oblong holes in the direction of the height when the brake is addressed by means of cylindrical flats, the arms are mounted freely turnably on the trunnions such that the brake in place constitutes a floating assembly without constraint, whose axis of symmetry in the face plane is held in the plane of the axis of symmetry of the width of the wheel by the brake cable passing through a hole located in the upper and central position of the movable arch when the brake is at rest.
- the identical and reversible brake arms are mounted on trunnions by braces that are adjustable in height, and are interconnected in their plane by a metallic or plastic material arch, resiliently deformable in width, each arm carrying a hollow V shaped cam turned toward the interior of the brake, the bisecting edge of the dihedral being horizontal, the plane angle being about 90°, which cam is pierced by a hole perpendicular to the longitudinal axis of the arm in which slides a pin in a rectilinear manner, this pin being adapted to be either provided at its screw threaded end with a cylindrical pad the cam finger forming a portion of the movable arch, or being provided at its screw threaded end with a pad holder that moves rectilinearly, the cam finger being independent, the control of the brake, the holding in position and resilient return of the pads being ensured by the movable arch prestressed in width.
- the movable control arch is in three portions constituted by two elbowed branches of metallic rod connected to the pins by screws permitting adjustment as to height of the movable arch relative to the horizontal axis of the pins and by an assembly sleeve connected to the elbowed branches by screws secured to the sleeve permitting adjustment of the spacing of the pads relative to the wheel rim, an adjustment of the orientation of the passage hole of the brake cable and adjustment of the angular position of the height of the movable arch in the plane perpendicular to the axis of rotation of the wheel when the sleeve has a flat portion offset relative to its longitudinal axis, the movable arch being adapted to deform resiliently if the pressure between the pads and the wheel rim is too great.
- the movable control arch is of monobloc construction of plastic material, of sections designed to be able to deform by opening if the pressure between the pads and the wheel rim becomes too great, it is provided in each springing with a through hole of octagonal profile, which can be a toothed profile, which coacts with the octagonal or toothed section of the pin for the positioning of its longitudinal axis relative to those of the arms according to the desired mounting, in that it has two holes for the passage and demobilization of the cable whose choice of mounting of the brake depends on the path given by the brake handle, a blocking screw being provided to secure the cable to the movable arch, the latter being adapted to be cut in the form of a blade adapted to scrape the mud which collects on the tire.

a hollow pad mounted on the cylindrical pad carrier permitting the pad to have an automatic orientation parallel to the wheel rim, which pad carrier is screwed to the screw threaded rounded end of a rod receiving a ring of elastomer and a blocking nut, rod carried by a rectangular nut guided in translation by the sides of a recess of the braking arm is adjustable in height relative to the wheel rim by a screw secured to the braking arm.

the nut of each arm serving for the adjustment in height of the pad relative to the wheel rim with the help of the screw with its sides in contact with the lateral calibrated sides of the chamfered arm and carries a rear portion protruding outside the arm, provided with an adjustment screw so as to obtain permanent adjustment of the longitudinal axis of the pad of about 5° relative to the wheel rim, this adjustment being adapted to be automatic in the case of omission of the portion.

cam fingers adapted to be mounted in a keyhole of the pins, that can be articulated on the pins, and can be provided with rollers.

the brake arms are of plastic material provided with metallic linings carrying the cams.

the brake according to the invention is adaptable to a disk brake.

BRIEF DESCRIPTION OF THE DRAWINGS

Other characteristics and advantages of the invention will become apparent from the following description of several embodiments of the invention, this description being given by way of non-limiting example, with reference to the accompanying drawings, in which:

FIG. 1 is a front view in partial cross-section along the line AA of FIG. 2, of a mechanical brake with pads in the rest position according to a first embodiment of the invention.

FIG. 2 is a side view of FIG. 1.

FIG. 5 is a front view in partial cross-section along the line CC of FIG. 6, of a mechanical brake with pads in the rest position according to a second embodiment of the invention.

FIG. 6 is a side view of FIG. 5.

FIG. 9 shows a front view in partial cross-section on the line EE of FIG. 10, of a mechanical brake with pads in the rest position according to a third embodiment of the invention.

FIG. 10 is a side view of FIG. 9.

FIG. 11 is a section on the line FF of FIG. 10.

FIG. 12 is a top plan view in section on the line GG of FIG. 9.

FIG. 13 is a longitudinal cross-section of a cam finger provided with rollers.

FIG. 14 shows a monobloc cam finger held by a screw.

FIG. 14A shows a monobloc cam finger held by a keyhole.

FIG. 15 shows a side view of a blocking nut for a movable pad.

FIG. 16 shows a side view of an all terrain bicycle showing the positions of mounting of the brakes and the paths of the cables and sleeves.

FIG. 17 shows a front view in partial cross-section on the line HH of FIG. 18, of a mechanical brake with pads in the rest position according to a fourth embodiment of the invention.

FIG. 18 shows a side view of FIG. 17.

FIG. 19 shows a front view in cross-section on the line JJ of FIG. 21 of a pad carrier with rectilinear movement that can be mounted on the brake of the fourth embodiment.

FIG. 20 shows the pad carrier of FIG. 21 in cross-section on the line II.

FIG. 21 shows a side view of FIG. 19.

FIG. 22 shows a front view of a movable arch of the first embodiment provided with an anti-mud blade.

FIG. 23 shows a side view of FIG. 22 in cross-section on the line KK.

FIG. 24 shows a front view of an arm of the third embodiment made of plastic material, provided with a metallic lining.

FIG. 25 shows a top plan view of FIG. 24 in cross-section on the line LL.

FIG. 26 shows a side view of FIG. 24.

FIG. 27 shows a pin carrying a cam finger of the first embodiment.

FIG. 28 shows a side view of FIG. 27.

FIG. 29 shows a longitudinal cross-sectional view of a pin provided with a cam finger articulated on the pin.

FIG. 30 shows a front view in cross-section on the line MM of FIG. 31, of a disc brake using the fourth embodiment.

FIG. 31 shows a side view of FIG. 30.

FIG. 32 shows the movable control arch for the brake of FIGS. 30 and 31.

DESCRIPTION OF THE PREFERRED EMBODIMENTS

Figure 4:
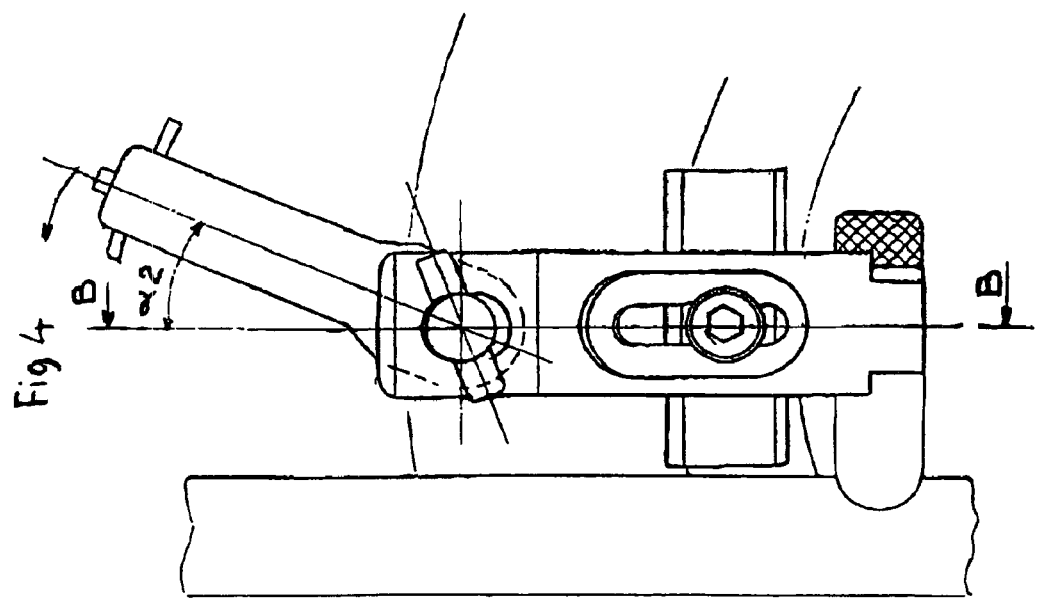
FIG. 4 is a side view of FIG. 3.
Figure 3:
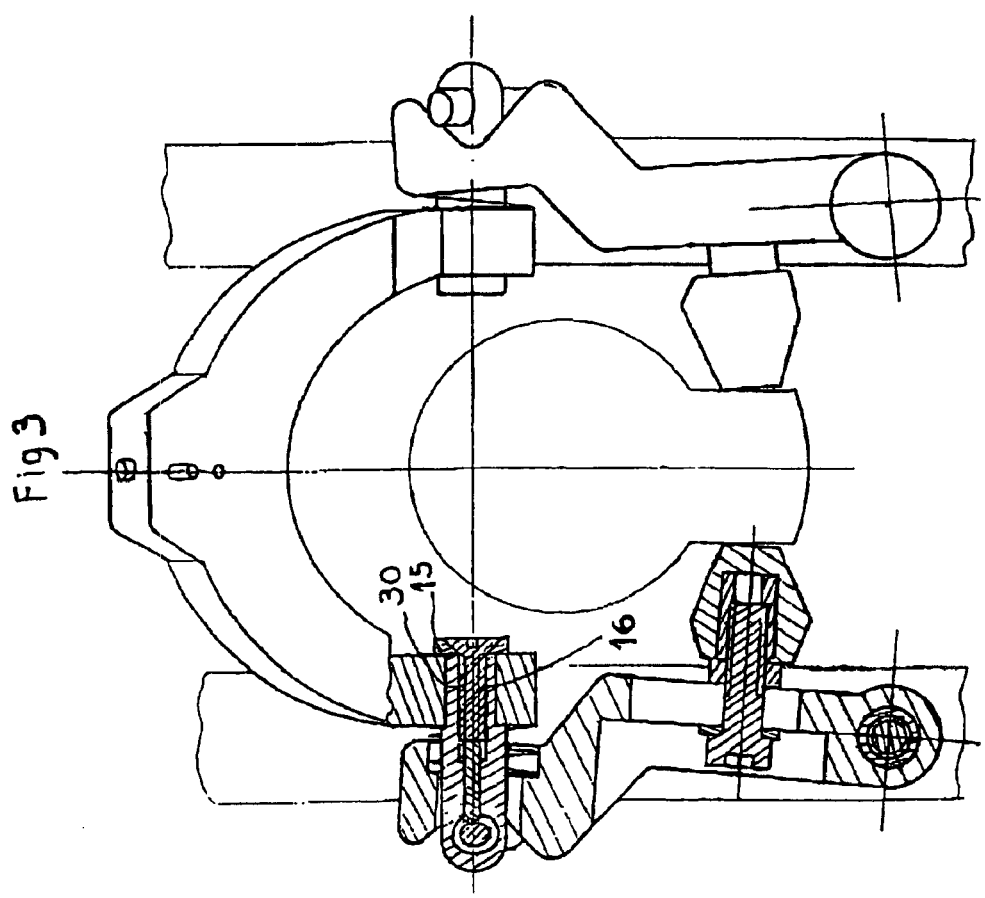
FIG. 3 is a front view in partial cross-section on the line BB of FIG. 4 of the brake of FIG. 1 in the active braking position.

The brakes shown in all the embodiments are mounted for the rear wheel, except for FIG. 16, for better understanding of the drawings the stays which carry the trunnions are shown vertical.

FIGS. 1 to 4, 13, 14, 16, 22, 23, 27, 28 and 29 disclose the mechanical brake with pads of the first embodiment.

The movable control arch 1 of plastic material, with cross-sections calculated to be able to deform by opening if the pressure between the wheel rim and the brake pads 27 is too great, is pierced in each springing 3 with a transverse hole 2 of octagonal cross-section, FIG. 23. Two holes 4 and 5 calibrated to the diameter of the brake cables pass through the upper portion at its middle of the arch 1. A screw threaded hole 6 perpendicular to 4 and 5 receives a blocking screw 7 for the brake cable 8. In each hole 2 is mounted a pin 9 which carries a cam finger 21. This pin 9 emerges from a cylinder and is cut at one end with the same octagon 10 as 2, which permits being able to position the longitudinal axis of the arch 1 relative to those of the arms 17 differently according to the desired mounting, the angle α1 can measure −45°, 0°, +45°; the other end of the pin 9 is cut in the shape of a half round 11, FIG. 27. A hole 12 is pierced along the axis 11, perpendicular to the longitudinal axis of the pin 9, it is adapted to receive a cam finger 21, either monobloc, FIG. 14, or provided with rollers 154 held by circlips 155, FIG. 13, permitting reducing friction. Along the longitudinal axis of 9, a smooth hole 13 opens into 12, it receives a rod 14 calibrated as to length which stops the cam finger in translation; a screw threaded hole 30 receives a blocking screw 16 whose head rests against a ring 15, FIG. 3. The brake arms 17, left and right, are identical and reversible. Each arm is traversed at its lower portion by a smooth hole 18 by which it is mounted freely turnably on the trunnion 19 when the screw 20 is blocked. A recess 22 is hollowed out in known manner to receive the pad carrying screw 28 which holds the pad 27 as well as the thickness and orientation rings 29. At the upper portion of the arm is located a cam 23, whose flanks 40 and 41 form an angle about 90°, the bisecting edge of the dihedral is horizontal, the cam is turned outwardly of the arm. To compensate the changes of angles of the flanks 40 and 41 given by the swinging of the arm about the axis of 19, the value of the angle of the flank 40 increasing and that of the flank 41 decreasing relative to the axis of 9 which remains horizontal during movement, the flank angle 41 is more open by about 2° such that the finger 21 bears on the two flanks of the cam during movement, this if the pin 9 is mounted with a monobloc cam finger FIG. 14 or with rollers FIG. 13, if the pin 9 receives an articulated cam finger 158, FIG. 29 this dyssemetry is not necessary. An oblong hole 24 whose axis is located in the plane of symmetry of the arm 17 and symmetrical relative to the edge of the dihedral, traverses the thickness of the cam finger perpendicularly relative to the longitudinal axis of the arm to open in a cylindrical flat 25 located on the interior side of the arm. A compression spring 26, of which a portion is disposed within 25, is mounted about the pin 9, it bears against the bottom of 25 and against the exterior of the springing 3 of 1. The springs 26 establish an interaction between the arch 1 and the arms 17 by means of cams 23 and fingers 21 of the pins 9, they maintain the spacing of the arm at rest and return the arms and movable arch after a braking action. In the mounting of the brake according to FIGS. 1 and 2, the angle $\alpha 1$ is about +45°, and can thanks to the octagons 2 and 10 be −45° or 0°, it is envisagable that 2 and 10 are provided with toothed profiles, with an angle of 20° between the teeth so as to be able to adjust the angle $\alpha 1$ stepwise by 20°. To act on the movable arch 1 and to actuate the brake, two mountings of the cable and the sleeve are possible, shown in FIG. 16, the brake in question being mounted on the fork: either the brake cable 31 leaving the brake handle 32 passes freely through the hole 4 or 5 of the arch 1, the blocking screw 7 is released, then the hole 33, located in the rounded portion of the fork head, at the outlet of which it is stopped by a cable clamp 34, and it is the brake sleeve 35 which, bearing against the arch 1, presses it rearwardly and activates the brake, on bicycles equipped with telescopic forks the brake cable passes through the hole which is located at the upper portion of the arch that reinforces the fork arms; namely the cable 36, shown in broken lines, leaving the handle 32, passes through the hole 33, then is stopped in a hole 4 or 5 of the arch 1 by the screw 7, the sleeve 37 shown in broken line has a double elbow and bears against the rear of the fork head. The rear brake can receive these two types of mountings by using the hole located in the middle of the bar of the stays. As a function of the path followed by the brake handle, it is necessary to choose the hole 4 or 5 of the movable arch, the hole 5 will be preferred if the path is great. At rest, the arms 17 must be about vertical. The screws 20 are manually set or with a quarter of a turn so as to disassemble the brake rapidly.

The brake cable 8 passes through the medial plane in the direction of the width of the movable arch 1 and through the median plane of the bicycle, the springs 26 also spacing the arms 17 of the springings 3 of 1, the brake remaining resiliently floating is thus stabilized in the median plane of the bicycle, without constraint. When the arch 1 pivots by the tension given to the cable or the sleeve, the cam fingers 21 driven in rotation by the pins 9 bear against the flanks 40 and 41 of the cams 23 and force the arms 17 inwardly, the pads 27 rubbing against the wheel rim, the springs 26 are compressed, the angle $\alpha 1$ is reduced to $\alpha 2$. Thanks to the elongated shape of the holes 24, the arms 17 are not impeded in their movements by the pins 9. The brake floating resiliently without constraint, the cams 23 being equally urged by the fingers 21, these features mean that even if the pads 27 do not have the same extent relative to the arms 17, the brakage of the assembly is self positioning and the pads rub with the same force against the wheel rim thereby giving a good quality of braking without impairing the path of the bicycle. The deformation of the movable arch, the play of the lever arms of the pinematics and the large paths without a hard point required of the brake handle, permit good control of braking, without effort.

FIGS. 5 to 8, 14A and 16 disclose the second embodiment of the invention.

The brake arm 42 has a configuration like that of arm 17. A staged hole 43 opening and vertical is located in the plane of symmetry of the arm seen from the side, FIG. 6, and in the vertical plane of symmetry of the hole 45, FIG. 5. The arm is mounted on the trunnion by the hole 45, turning freely without constraint. The recess 44, without a wall, is calibrated as to width on the two sides 46. The pad carrying system comprises: a rectangular nut 47 guided in translation by the sides 46, carrying on the internal side at its middle a screw threaded rod 48 with a rounded end; a screw 53 comprising three decreasing diameters, the ends disposed in the hole 43 are smooth, the upper portion carries a contour 54 for a hexagonal key; an elastomeric ring 52 adapted to brake the screw-nut system and to take up play; a blocking nut 51; a cylindrical pad carrier 49 provided with a contact flat 56; a hollow pad 50 recessed at 55 to permit locking the nut 51, FIG. 12. To mount the pad: place the ring 52 on the rod 48; screw the nut 51 on 48; thread the pad 50 on the pad carrier 49, the wall which closes the pad at one end must be positioned toward the rear of the wheel; screw the pad holder 49 onto 48, the rounded end of 48 must press against the pad so as to constitute a stop in translation for the pad and a system of resilient cam in rotation to return the pad to the horizontal when the brake is at rest; block the nut 51 against the flat 56 by taking care to keep the longitudinal axis of the pad horizontal; introduce the nut 47 to within the recess 44; raise the screw 53 through the hole 43; assemble by turning the screw 53. When the arm is mounted on the trunnion, the screw 53 is stopped in translation upwardly by a change of cross-section of 43 and downwardly by the generatrix of the trunnion. The pin 57 is provided with a head 58 which is pierced by a hole 59 transversely along the longitudinal axis, in which is held by the screw 61 the elbowed branch 60 of the movable arch 67 which permits the latter to be adjustable in height. A keyhole made from two intersecting holes 62 and 64 traverses the pin opposite the head 58, the longitudinal axes of 62 and 64 form an angle $\alpha 3$ of about 60° with the longitudinal axis of the hole 59, FIG. 6. A hole 65 is pierced perpendicularly to the longitudinal axes of 62 and 64, against the head 58, it serves for the passage of the adjustment key of the screw 53. A cam finger 63, FIG. 14A, is disposed in the keyhole, this mounting permitting the finger an angular liberty relative to the longitudinal axis of the pin 57 and permitting it a slight swinging in the keyhole if needed to press equally against the flanks of the cam during swinging movement of the arm, without dissymmetry of the angles of the flanks of the cams as has been explained in connection with the first embodiment. The position of the cam on the arm, the oblong hole, the cylindrical flat and the spring are identical to those described in the first embodiment. The movable arch 67 for controlling the brake is in three parts: two elbowed branches 60 of metallic rod and an adjustment sleeve 68. This sleeve 68 has at its middle a transverse hole 72 of the dimension of the brake cable 71, a screw 70 can be used to immobilize the cable on the sleeve. Two screws 69 located transversely at each end of the sleeve serve to immobilize the branches 60 on the sleeve 68.

The overall operation of the brake is that described for the first embodiment. The adjustment in height of the movable arch 67 relative to the horizontal axis of the pins 57 takes place with the help of screws 61, it is useful to adapt it to the path of the cable given by the handle of the brake. The adjustment of the spacing of the pads 50 relative to the wheel rim and the orientation of the passage hole 72 relative to the cable take place with the help of screw 69 of the sleeve 68. The adjustment in height of the pads 50 relative to the wheel rim takes place with the help of screw 53. The contact surface of the pads 50 against the wheel rim is always parallel to the latter thanks to the mounting of the pads 50 on the cylindrical pad carriers 49. If the pressure of the pads 50 against the wheel rim is too great, the branches 60 open resiliently to avoid blocking the wheels. The rapid disassembly of the brake for the passage of the wheel takes place by the manual screws 73, it is also possible to use a screw 69 of the sleeve 58 so as rapidly to space the pads from the wheel rim. The arms 42 are mounted freely turnably on the trunnions such that the brake in place constitutes a floating assembly without constraint, whose axis of symmetry along the front face, FIG. 5, is held in the plane of symmetry of the width of the wheel by the brake cable 71 passing through the hole 72 situated in the upper and central position of the movable arch 67 when the brake is at rest.

Figure 8:
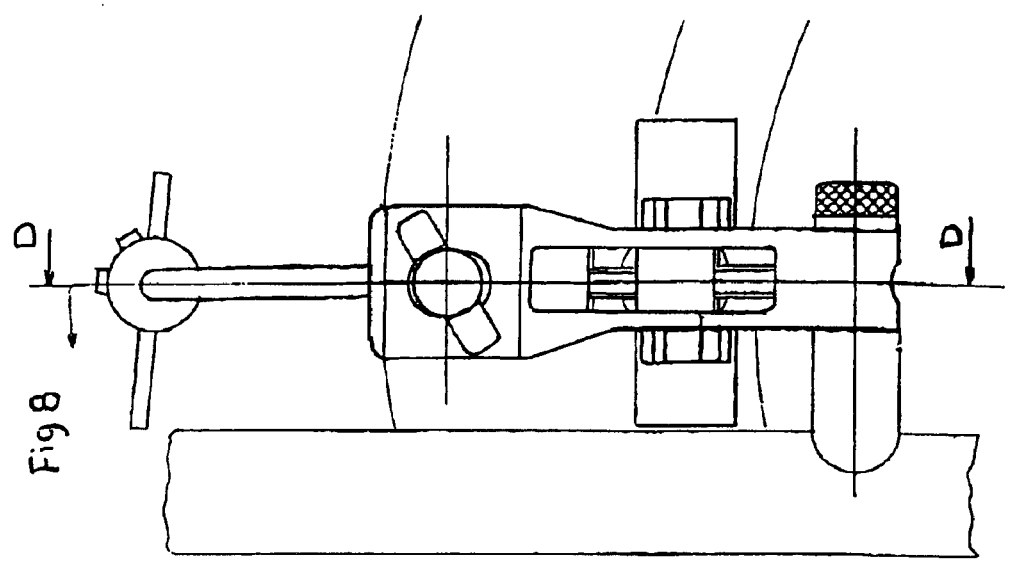
FIG. 8 shows a side view of FIG. 7.
Figure 7:
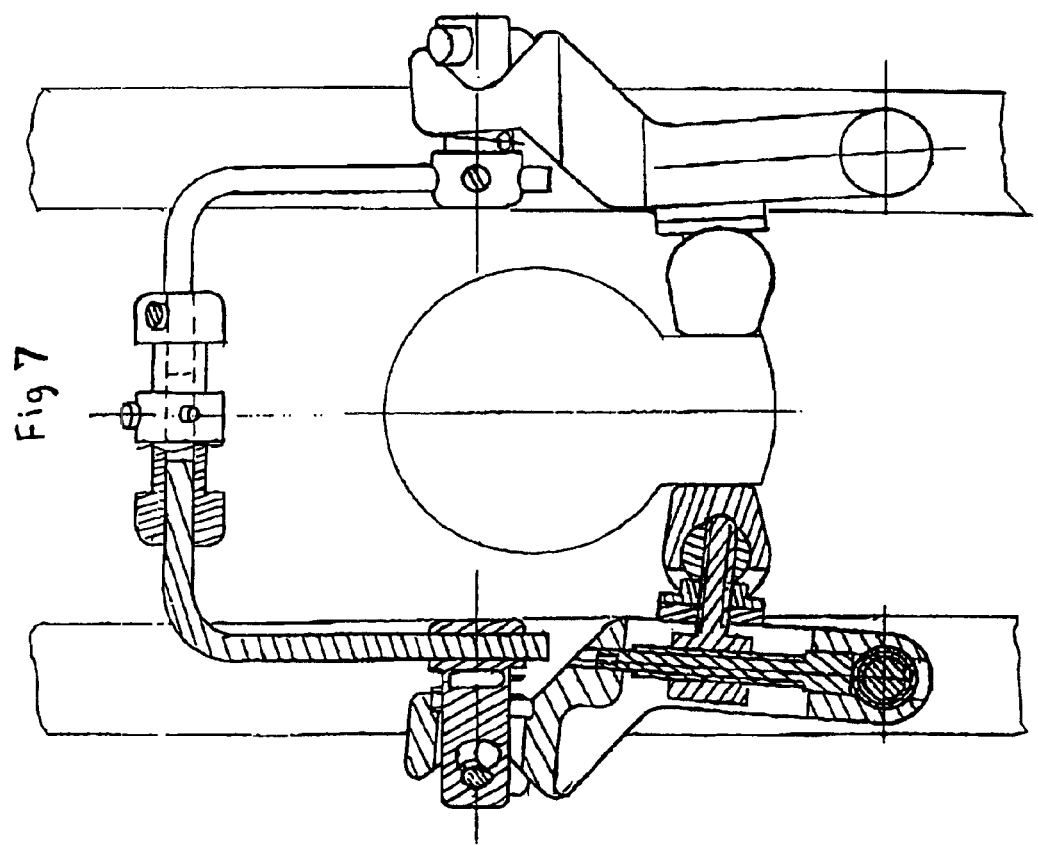
FIG. 7 is a front view in partial cross-section along the line DD of FIG. 8 of the brake of FIG. 5 in the active braking position.

FIGS. 7 and 8 show the brake undergoing braking action.

FIGS. 9 to 12 and 16 disclose the third embodiment of the invention.

The brake arms 75 are identical and reversible. Each arm 75 is mounted on the trunnion 81 turning freely without constraint, it is held by the manual locking screw 82. A stage blind hold 77 is pierced along the longitudinal axis of the lower portion of the arm. The screw 78 for adjustment in height of the pad has two cylindrical smooth portions at the ends which enter the staged hole 77, with respect to the bar of the T of the opening 76 of the arm 75 a portion of the screw carries a hexagon 79 for manipulating the screw. The T shaped opening 76 located on opposite sides of the plane of symmetry of the arm seen from the side, FIG. 10, has its sides 74 calibrated as to width. The nut 80 for adjustment in height of the pads, which coacts with the screw 78, can be present according to two embodiments. For the first embodiment carried by the left arm in FIGS. 9, 10 and 12, the nut 80 has a rear portion 84 which extends outside arm 75, the sides 85 and 80 are chamfered to permit, thanks to the screws 100 carried by 84 which bear against the rear of the arm 75, a permanent adjustment of about 5° of the longitudinal axis of the pad 89 relative to the plane of the wheel rim; the elastomeric ring 86, the blocking nut 87, the pad carrier 88 and the pad 89 are identical to those described for the second embodiment. For the second embodiment carried by the right arm according to FIGS. 9 and 12, the sides 91 of the nut 90 are chamfered to permit resilient clearance of about 5° from the longitudinal axis of the pad relative to the plane of the wheel rim, the elastomeric ring serves as a return spring. The system carried by the left arm is a permanent angle adjustment, the one carried by the right arm is an automatic alignment of the plane of contact of the pad with that of the wheel rim. The cam 92 disposed at the upper portion is turned outwardly of the arm, the bisecting ridge of the dihedral is vertical, the plane angle is about 90°, FIG. 11. The movable arch 93 is in three parts: two elbowed branches 94 of round metallic rod, which terminate in cam fingers 96 and pass through the pins 101 on the outer side of the arms, and an assembly sleeve 95. So that the cam finger 96 bears properly against the wings of the cam 92 in the course of actuation of the brake and to compensate the inclination taken by the ridge of the dihedral when the brake arm 75 pivots inwardly, the angle of opening of the dihedral is greater by about 4° in the lower portion 97 of the cam than in the upper portion 98, this angle being about 90° in this portion, to avoid touching the cam finger against the ridge 108, the latter is slightly curved. An oblong hole 99 passes through the rear of the cam perpendicular to the longitudinal axis of the arm, it opens in a cylindrical flat 107. The pin 101 is traversed perpendicularly by a hole 102 which receives the cam finger 96 and axially by a tapped hole 103. An elastomeric spring 104 disposed about the pin 101 performs three functions: it serves as a holding and return spring for the arms after a braking action by pressing the cam finger 96 carried by the elbowed branch 94 against the cam, by its engagement in the flat 107 it positions the pin 101 in the middle of the oblong 99 when the brake is at rest, and it brakes the blocking screw 105 by permitting the latter to immobilize the finger 96 on the pin whilst pressing it against the ring 106. The sleeve 95 is provided with a flat portion 83 offset relative to its longitudinal axis so as to have an adjustment of the angular position of the top of the movable arch in the plane perpendicular to the axis of rotation of the wheel by causing the angle α4 to vary by the screw 109 for optimum mounting of the brake on the bicycle. The arms 75 are mounted freely turnably on the trunnions 81 such that the brake in place constitutes a floating assembly without constraint, whose axis of symmetry in the front view, FIG. 9, is maintained in the plane of the axis of symmetry widthwise of the wheel by the brake cable passing through a hole located in the upper and central position of the movable arch 93 when the brake is at rest.

The overall operation of the brake is that described above.

FIGS. 17 to 21 disclose a fourth embodiment of the invention.

The brake comprises two identical and reversible arms 111 in which are screwed at the lower portion two braces 112 mounted freely turnably in rotation by the recesses 113 on the trunnions. The brake arms 111 are interconnected in their plane by an arch 110, held by cementing, force fit or by screws, of metallic rod which can deform in width, the arms turning slightly on the trunnions, if one pad touches the wheel rim before the other and in case of too great pressure between the pads and the wheel rim to avoid blocking of the wheel, this arch can be also of plastic material. To adjust the brake pads 122 as to height relative to the wheel rim, it is necessary to act on the screwing of the braces 112 in the arms 111 before mounting the brake on the trunnions. The V shaped cams 114 are carried by the arms 111, the flat angle of the dihedral is about 90°, the bisecting horizontal edge of the dihedral is located at the level of the wheel rim when the brake is mounted, they are turned inwardly of the brake, they are traversed each by a cylindrical hole 148 in which slides in a rectilinear manner the pin 115 perpendicularly relative to the arm. Two embodiments of pad, of pad carrier, of pins and of movable arches are presented. In the first embodiment of FIGS. 17 and 18, the pin 115 comprised by a smooth cylindrical portion 116 and a screw threaded end 117, carries a transverse hole 118 which receives the cam finger 119 as an integral part of the movable arch 125 and a screw threaded longitudinal hole 120 which receives the immobilization screw 121. A cylindrical brake pad 122 provided with a screw threaded insert 123 is screwed on 117, it is immobilized by the blocking nut 124. This cylindrical pad serves for children's bicycles. The movable elbowed arch 125 is resiliently restrained in the direction of width, it serves to control the brake, to hold in position and resiliently to return the pads. A roller 126 is stopped in translation at the middle of 125. The brake cable 128 is secured to the arch 110 by a movable connection member 127, it is stopped on the latter by the screw 149. For the second embodiment, FIGS. 19, 20 and 21, which have traditional pads, the pin 129 carries a cylindrical portion 130 which extends out of the arm 111 and which is traversed by a hole 131 in which is secured one end of the movable arch 132 outside the arm by the screw 133. A transverse hole 134 whose longitudinal axis makes an angle α5 of about 75° with that of the hole 131 receives a finger of independent cam 135, and is forcibly ensleeved. The pad carrier 136 has a tapped portion 138 at its rear middle and two wings 137 which have a spacing equal to the width of the arm 111 at the height of the cams 114 and which serve for guiding in translation the pad carrier 136 such that the latter will not turn on itself during the braking action. The adjustment of the spacing of the pads takes place before mounting by the screwing of 138 on 139. During operation of the brake, 139 turns in 138. The movable arch 132 is resiliently pre-stressed in width to ensure the holding and resilient return of the pads by pressing the cam fingers 135 against the cams 114. During braking action, the arches 125 and 132 lessen in width.

FIGS. 30 to 32 disclose the brake of the fourth embodiment adapted for a disc brake. The brake body 140 is slotted to let the disc pass, it carries cams 141. A bore 142 receives the pin 143. The movable control arch 144 also serves as cam fingers, it is held on the pins by screws 147, it is resiliently pre-stressed as to width to serve as a return spring for the pins, it is connected to the brake cable 146 by a member 145 movable in rotation.

FIGS. 22 and 23 disclose a movable arch 150 shaped as a blade 151 adapted to scrape the mud which clings to the tire, it is provided to be mounted on the brake of the first embodiment.

The brake arms described in the three first embodiments are of light metal, it is envisagable that these arms have no tapping or rivet and to make them of plastic material 152 provided with a metallic lining 153 in the vicinity of the cams, FIGS. 24, 25 and 26.

FIG. 13 shows in longitudinal cross-section a cam finger provided with rollers 154, held by circlips 155, adapted to decrease friction. The principle is useful in the first two embodiments.

The cam fingers bear only on a portion of the flanks during braking action, so it is possible in the case of wear of the cams to invert the arms on the trunnions, for the three first embodiments and to reverse the brake for the fourth.

The industrial interest of the invention is the production of a high performance brake comprising identical pieces for the two arms. The arms can be of plastic material. The adjustment of the pads being simple, this braking system is of interest for rental bicycles. It can personalize a brand of bicycles, at present all terrain bicycles are provided for the most part with identical brakes from a single brand of components.

What is claimed is:

1. Mechanical brakes with pads adapted to be mounted on bicycles, acting to brake by friction of the pads, characterized in an arch movable in rotation (1, 67, 93, 125, 132, 144) whose axis of movement is parallel to the axis of rotation of the wheel, the arch being activated at an upper and central portion by the action of one of a cable (8, 36, 71, 128, 146) and a sleeve (35) connected to a brake handle (32), said arch connected at each end disassembleably to a pin (9, 57, 101, 115, 129, 143), said pin receiving a cam finger (21, 63, 96, 119, 135) which under the action of the movable arch acts with a movement of rotation against the flanks (40, 41, 97, 98) of a hollow cam (23, 114, 141) pierced by a hole (24, 99, 142, 148) provided to receive the pin (9, 57, 101, 115, 129, 143), said hollow cam being V-shaped with a flat angle of the dihedral being about 90, said cam finger controlling by movement of rotation the action of the pads, and a resilient return system (26, 104, 125, 132, 144) of the pads.

2. Mechanical brakes adapted to be mounted on bicycles according to claim 1 characterized in that each brake comprises two identical and reversible arms (17, 42) mounted freely turnably on the trunnions (19), each of the arms carrying at an upper portion said V-shape hollow cam (23) pierced perpendicularly relative to the longitudinal axis of the arm by said hole (24), the hole having a oblong shape, and a cylindrical flat (25), cam (23) which is turned outwardly of the arm (17, 42) and whose ridge bisecting the dihedral is horizontal and the flat angle of about 90, the pins (9, 57) which pass through the cam (23) through the oblong hole (24) and the cylindrical flat (25) carries said cam finger (21, 63) and is connected to the movable arch (1, 67) on the interior side of the arm, the arms (17, 42) are held and returned to rest position after a braking action by metallic compression springs (26) disposed about said pins (9, 57), the arms (17, 42) are mounted freely turnably on the trunnions such that the brake in place constitutes a floating assembly, without constraint, whose axis of symmetry in the front view is maintained in the plane of the axis of symmetry and width of the wheel by the brake cable (8, 71) passing through a hole (4, 5, 72) located in the upper and central section of the movable arch (1, 67), when the brake is at rest.

3. Mechanic brakes adapted to be mounted on bicycles according to claim 1 characterized in that each brake comprises two identical and reversible arms (75) mounted freely turnably on trunnions (81), each of the arms (75) carrying at an upper portion thereof one of the V-shaped hollow cams (92), each of the hollow cams being pierced perpendicularly relative to a longitudinal axis of the arm by said hole (99), said hole having an oblong shape, and by a cylindrical flat (107), each said V-shaped hollow cam (92) being turned outwardly of the arm and having an edge bisecting the dihedral that is vertical, the pin (101) which passes through the cam (92) bearing on the outside of the arm (75), the cam finger (96) being one end of an elbowed branch (94) of the movable arch (93), the arms (75) being held and returned to rest position after a braking action by elastomeric springs (104) disposed about the pins (101), disposed in part in the cylindrical flats (107), the springs (104) also ensuring positioning of the pins (101) in the middle of said oblong holes (99) in a direction of the height when the brake is at rest, by means of the cylindrical flats (107), the arms (75) being mounted freely turnably on the trunnions (81) such that the brake in place constitutes a floating assembly without constraint, whose axis of symmetry in a front view is maintained in a plane of the axis of symmetry as to width of the wheel by the brake cable passing through a hole located in the upper and central position of the movable arch (93) when the brake is at rest.

4. Mechanical brakes adapted to be mounted on bicycles according to claim 1 includes identical and reversible brake arms (111) mounted on trunnions by stays (112) adjustable as to height, and are interconnected in their plane by the arch (110), the arch comprising one of metallic rod and plastic material, resiliently deformable as to width, each said arm (111) carrying one of the hollow V-shaped cams (114) turned inwardly of the brake, a ridge bisecting the dihedral being horizontal, the pin being provided at a screw threaded end (117) with a cylindrical shoe (122), the cam finger (119) forming a portion of the movable arch (125), the cam finger (135) being independent, the control of the brake, the holding in position and the resilient return of the pads being ensured by the movable arch (125, 132) pre-stressed as to width.

5. Mechanical brakes adapted to be mounted on bicycles according to claim 1, characterized in that the movable arch (67, 93) is in three parts constituted by two elbowed branches (60, 94) of metallic rod connected to the pins (57, 101) by screws (61, 105) permitting adjustment in height of the movable arch (67, 93) relative to a horizontal axis of the pins (57, 101) and by an assembly sleeve (68, 95) connected to the elbowed branches by screws (69, 109) secured to the sleeve (68, 95) permitting adjustment by spacing of the pads (50, 89) relative to a rim of the wheel, an adjustment of an orientation of a passage hole (72) of the brake cable (71) and an adjustment of an angular position of the upper portion of the movable arch in a plane perpendicular to the axis of rotation of the wheel when the sleeve (95) has a flat portion (83) offset relative to its longitudinal axis, the movable arch (67, 93) being adapted to deform resiliently if pressure between the pads and the wheel rim is too great.

6. Mechanical brakes adapted to be mounted on bicycles according to claim 1 characterized in that the movable control arch (1) is of monobloc construction of plastic material, with sections designed to be able to deform by opening if the pressure between the pads (27) and the wheel rim becomes too great, that the movable control arch is provided in each springing (3) with a transverse hole of one of an octagonal profile (2) and a toothed profile, which coacts with one of an octagonal section and a toothed section (10) of the pin (9) for positioning of a longitudinal axis relative to those of the arms (17) according to the desired mounting, and in that said arch has two holes (4, 5) for the passage and immobilization of the cable whose choice of mounting the brake depends on the path given by the brake handle, a blocking screw (7) being provided to secure the cable (8) and the movable arch (1), the latter (150) being adapted to be shaped as a blade (151) to scrape mud which clings to the tire.

7. Mechanical brakes adapted to be mounted on bicycles according to claim 1 characterized in that a hollow pad (50, 89) mounted on a cylindrical pad carrier 49, 88) permits the pad (50, 89) to have an automatic orientation parallel to a rim of the wheel, a pad carrier (49, 88) being screwed at a screw threaded rounded end (48) of a rod receiving a resilient ring (52) and a blocking nut (51), the rod being carried by a rectangular nut (47, 80) guided in translation by sides (46) of a recess (44) of a brake arm (42) that is adjustable in height relative to the wheel rim by a screw (53, 78) secured to the brake arm (42, 75).

8. Mechanical brakes adapted to be mounted on bicycles according to claim 7, characterized in that the nut (80) of each arm (75) serving for the adjustment of a height of a tab (89) relative to the wheel rim with the help of the screw (78) has its sides (85) in contact with lateral calibrated sides (74) of a chamfered said arm (75) and carries a rear portion (84) extending outside the arm, provided with an adjustment screw (100) so as to obtain permanent adjustment of a longitudinal axis of the pad (89) of about 5 relative to the wheel rim.

9. Mechanical brakes adapted to mounted on bicycles according to claim 1, characterized in that the cam fingers are mounted in a keyhole (62, 64) in the pins (57).

10. Mechanical brakes adapted to be mounted on bicycles according to claim 1, characterized in that the brake arms (152) are of plastic material provided with metallic linings (153) on the cam surfaces of said V-shaped hollow cams.

11. Mechanical brake adapted to be mounted on bicycles according to claim 1 characterized in that the brake is adapted for a disc brake.

12. A brake system for a wheel comprising:
a brake lever;
a pivoting element mounted so as to be pivotable about an axis parallel to an axis of rotation of the wheel;
means for urging the pivoting element into a rest position;
means for converting actuation of the brake lever into pivoting of the pivoting element away from the rest position;
pivotally mounted pad supporting means for supporting two brake pads, the pad supporting means being connected to the pivoting element; and
converting means for converting pivoting motion of the pivoting element into pivoting motion of each of the pad supporting means so as to force the pads against the wheel, the converting means comprising a V-shaped hollow cam.

13. The brake system of claim 12, wherein the converting means comprises a pin extending from each end of the pivoting element, each pin passing through a hole in a corresponding one of the pad supporting means.

14. The brake system of claim 13, further comprising a cam finger that extends from each of the pins, the cam finger being arranged to lie in the V-shape hollow cam.

15. The brake system of claim 14, wherein when the pivoting element is in said rest position, each said cam finger lies nearest a vertex of a corresponding said V-shaped hollow cam, and
wherein the pivoting of the pivoting element causes each said cam finger to pivot, thereby causing each said cam finger and a corresponding said vertex of said V-shape hollow cam to move away from one another, urging each said brake pad toward the wheel.

16. A brake system for a wheel comprising:
a arch mounted so as to be pivotable about an axis that is parallel to an axis of rotation of the wheel;
means for inducing pivoting motion in the arch;
a cam finger extending from each end of the arch; and
a pair of pivotally mounted arms with a brake pad connected to each arm, each arm comprising a V-shaped hollow cam in contact with one of the cam fingers;
wherein for each arm, when the arch is pivoted away from a position in which the cam finger lies nearest a vertex of the V-shaped hollow cam, the cam finger rotates with respect to the V-shaped hollow cam and pivots the arm so as to urge the brake pad toward the wheel.

17. The brake system of claim 16, wherein each of the ends of the arch comprises a pin that extends through a hole in a respective one of the arms, with each of the cam fingers extending away from one of the pins.

18. The brake system of claim 16, wherein the means for inducing pivoting motion in the arch comprises a lever and a cable, a first end of the cable being attached to the lever, and a second end of the cable being attached to the arch.

* * * * *